US012654412B2

(12) United States Patent
Burström et al.

(10) Patent No.: US 12,654,412 B2
(45) Date of Patent: Jun. 16, 2026

(54) PRESS APPARATUS

(71) Applicant: Quintus Technologies AB, Västerås (SE)

(72) Inventors: Per Burström, Västerås (SE); Stefan Gustafsson, Västerås (SE)

(73) Assignee: Quintus Technologies AB, Västerås (SE)

( * ) Notice: Subject to any disclaimer, the term of this patent is extended or adjusted under 35 U.S.C. 154(b) by 637 days.

(21) Appl. No.: 18/023,972

(22) PCT Filed: Sep. 2, 2020

(86) PCT No.: PCT/EP2020/074438
§ 371 (c)(1),
(2) Date: Feb. 28, 2023

(87) PCT Pub. No.: WO2022/048739
PCT Pub. Date: Mar. 10, 2022

(65) Prior Publication Data
US 2023/0241853 A1 Aug. 3, 2023

(51) Int. Cl.
*B30B 11/00* (2006.01)
*B22F 3/15* (2006.01)

(52) U.S. Cl.
CPC .............. *B30B 11/002* (2013.01); *B22F 3/15* (2013.01); *B30B 11/005* (2013.01); *B22F 2003/153* (2013.01)

(58) Field of Classification Search
CPC .. B22F 3/15; B22F 2003/153; B22F 2203/11; B22F 2203/13; B30B 11/002; B30B 11/005; B30B 15/26; B30B 15/34
See application file for complete search history.

(56) References Cited

U.S. PATENT DOCUMENTS 5,251,880 A 10/1993 Ishii et al.
2011/0008741 A1 * 1/2011 Gardin .................... B22F 3/003 432/19
2011/0165283 A1 7/2011 Nakai et al.
(Continued)

FOREIGN PATENT DOCUMENTS

CN 205341924 U 6/2016
DE 4203959 A1 9/1992
(Continued)

*Primary Examiner* — Ricardo D Morales
(74) *Attorney, Agent, or Firm* — Flaster Greenberg P.C.

(57) ABSTRACT

A press apparatus includes a pressure vessel arranged to hold pressure medium therein during use of the press apparatus. The pressure vessel includes a top end closure and a bottom end closure. A furnace chamber is arranged within the pressure vessel so that pressure medium can enter and exit the furnace chamber, the furnace chamber at least in part defining a treatment space arranged to accommodate at least one article. The press apparatus includes at least one outer convection loop pressure medium guiding passage in fluid communication with the furnace chamber and arranged to form an outer convection loop within the pressure vessel. The outer convection loop is arranged to guide the pressure medium after having exited the furnace chamber in proximity to an inner surface of one or more wall(s) of the pressure vessel to a space between the furnace chamber and the bottom end closure.

20 Claims, 4 Drawing Sheets

(56) References Cited

U.S. PATENT DOCUMENTS

| | | | |
|---|---|---|---|
| 2014/0276157 | A1 | 9/2014 | Macneil et al. |
| 2016/0039163 | A1 | 2/2016 | Nakai et al. |
| 2020/0025446 | A1 | 1/2020 | Nakai et al. |

FOREIGN PATENT DOCUMENTS

| | | | |
|---|---|---|---|
| DE | 102007023703 | A1 | 11/2008 |
| JP | 401230984 | A | 9/1989 |
| JP | H05106800 | A | 1/1993 |
| JP | H0790320 | A | 4/1995 |
| JP | 409133470 | A | 5/1997 |
| JP | 2007309548 | A | 11/2007 |
| RU | 2427449 | C1 | 8/2011 |
| RU | 2593892 | C1 | 8/2016 |
| SU | 1061934 | A1 | 12/1983 |
| WO | 2009076973 | A1 | 6/2009 |
| WO | 2018171884 | A1 | 9/2018 |
| WO | 2019149379 | A1 | 8/2019 |

* cited by examiner

PRESS APPARATUS

CROSS-REFERENCE TO RELATED APPLICATIONS

This application is the 371 National Stage of International Application No. PCT/EP2020/074438, filed Sep. 2, 2020, the disclosure of which is incorporated herein by reference in its entirety.

TECHNICAL FIELD

The present invention generally relates to the field of high-pressure technology, in particular pressure treatment. More specifically, the present invention relates to a press apparatus for treatment of an article for example by means of hot pressing, such as hot isostatic pressing (HIP).

BACKGROUND

Hot isostatic pressing (HIP) employs a pressure medium in form of a pressurized heated gas to achieve for example consolidation, densification, or bonding of high performance components and materials. HIP may for example be used for reducing or even eliminating porosity in processed articles, achieving 100% of maximum theoretical density in process articles such as castings (e.g., turbine blades), resulting in exceptional resistance to fatigue, impact, wear and abrasion. HIP may in addition be used in manufacturing of products by means of compressing powder (which may be referred to as powder metallurgy HIP, or PM HIP), which products are desired or required to be fully, or substantially fully, dense, and to have pore-free, or substantially pore-free, outer surfaces, etc. The products obtained from HIP processing may for example be used in airplane bodies, aviation engines, car engines, human-body implants, and in the offshore industry, just to mention a few applications. HIP provides many benefits and has become a viable and high performance alternative and/or complement to conventional processes such as forging, casting and machining. An article to be subjected to pressure treatment by HIP may be positioned in a load compartment or chamber of a thermally insulated pressure vessel. A treatment cycle may comprise loading the article, treating the article, and unloading the article. Several articles may be treated simultaneously. The treatment cycle may be divided into several parts, or phases, such as a pressing phase, a heating phase, and a cooling phase. After loading an article into the pressure vessel, it may then be sealed, followed by introduction of a pressure medium (e.g., comprising an inert gas such as Argon-containing gas) into the pressure vessel and the load compartment thereof. The pressure and temperature of the pressure medium is then increased, such that the article is subjected to an increased pressure and an increased temperature during a selected period of time. The increase in temperature of the pressure medium, which in turn may cause an increase in temperature of the article, is provided by means of a heating element or furnace arranged in a furnace chamber of the pressure vessel. The pressures, temperatures and treatment times may for example depend on the desired or required material properties of the treated article, the particular field of application, and the required quality of the treated article. Pressures in HIP may for example be in the range from 200 bar to 5000 bar, such as from 800 bar to 2000 bar. Temperatures in HIP may for example be in the range from 300° C. to 3000° C., such as from 800° C. to 2000° C.

When the pressure treatment of the article is finished, the article may need to be cooled before being removed, or unloaded, from the pressure vessel. Characteristics of the cooling—for example the rate thereof—of the article may affect the metallurgical properties of the treated article. It is generally desired to be able to cool an article in a homogeneous manner, and also, if possible, to be able to control the cooling rate. Efforts have been made to reduce the period of time required for cooling of an article subjected to HIP. For example, during cooling phase, it may be required or desired to decrease the temperature of the pressure medium (and thereby of the article) rapidly without causing any large temperature variations within the load compartment (e.g., so that the temperature within the load compartment is reduced in a uniform manner) in a controlled manner, and to maintain the temperature at a certain temperature level or within a certain temperature range during a selected period of time with no or only small fluctuations in temperature during the selected period of time. By not having any large mean temperature variations within the load compartment during cooling of an article, there may be no or only very small temperature variations within different portions of the article during the cooling thereof. Thereby, internal stresses in the treated article may be reduced. In some HIP applications, a relatively high cooling rate may be desired or even required.

SUMMARY

A press apparatus (e.g., configured to carry out HIP) generally comprises a plurality of pressure medium passages within a pressure vessel of the press apparatus. Some of the pressure medium passages may form a forced convection loop within the pressure vessel, for providing a capability to controllably cool pressure medium in a load compartment within the pressure vessel. Some of the pressure medium passages may form a natural convection loop within the pressure vessel.

The inventors have found that, particularly at relatively high rates of cooling, at least part of the flow of pressure medium in the forced convection loop during the cooling phase may not be guided in the forced convection loop—at least not in its entirety or close to its entirety—but may at least to some extent instead be guided in pressure medium guiding passages not part of the forced convection loop. This may reduce the effectiveness of the cooling of the pressure medium in the load compartment, which in turn may reduce the rate of cooling, which may be undesired.

In view of the above, a concern of the present invention is to provide a press apparatus having a capability of effectively cooling the pressure medium in a pressure vessel of the press apparatus, e.g., within a load compartment of the pressure vessel, during varying operating conditions of the press apparatus and particularly during a cooling phase at relatively high rates of cooling.

To address at least one of this concern and other concerns, press apparatuses and a method in a press apparatus in accordance with the independent claims are provided. Preferred embodiments are defined by the dependent claims.

According to a first aspect of the present invention, a press apparatus is provided. The press apparatus could in alternative be referred to as a pressing arrangement, or simply a press, or a hot isostatic press.

The press apparatus according to the first aspect of the present invention comprises a pressure vessel, which is arranged to hold pressure medium therein during use of the press apparatus. The pressure vessel comprises a top end closure and a bottom end closure. The press apparatus comprises a furnace chamber, which is arranged within the pressure vessel and arranged so that pressure medium can enter and exit the furnace chamber. The furnace chamber is at least in part defining a treatment space that is arranged to accommodate an article (or more than one articles). The press apparatus is configured to subject the article(s) to a treatment cycle including a cooling phase. The press apparatus comprises at least one outer convection loop pressure medium guiding passage, in fluid communication with the furnace chamber and arranged to form an outer convection loop (which might instead be referred to as an outer cooling loop) within the pressure vessel. The outer convection loop is arranged to guide the pressure medium after having exited the furnace chamber in proximity to an inner surface (or inner surfaces) of wall(s) of the pressure vessel to a space between the furnace chamber and the bottom end closure. The press apparatus comprises a pressure medium flow generator, arranged within the pressure vessel and in fluid communication with the furnace chamber. At least during a cooling phase of the treatment cycle, the pressure medium flow generator is arranged to generate a transport of pressure medium from at least the space between the furnace chamber and the bottom end closure into the furnace chamber, so as to cool the pressure medium in the treatment space.

By guiding pressure medium in proximity to the inner surface of walls of the pressure vessel, transfer of heat from the pressure medium to the outside of the pressure vessel may take place via the walls of the pressure vessel. Thereby, the temperature of the pressure medium in the outer convection loop may become lower than the temperature of the pressure medium in the treatment region. The outer convection loop and the flow of pressure medium from at least the space between the furnace chamber and the bottom end closure into the furnace chamber generated by the pressure medium flow generator may form a forced convection loop within the pressure vessel.

The press apparatus according to the first aspect of the present invention comprises at least one pressure medium guiding passage arranged within the pressure vessel such that pressure medium may pass from the furnace chamber to the space between the furnace chamber and the bottom end closure, or vice versa, via only the at least one pressure medium guiding passage.

By the fact that pressure medium may pass from the furnace chamber to the space between the furnace chamber and the bottom end closure, or vice versa, via only the at least one pressure medium guiding passage, it may be meant that the pressure medium does not need to pass through the outer convection loop in order to go from the furnace chamber to the space between the furnace chamber and the bottom end closure, or vice versa, if the pressure medium goes via the at least one pressure medium guiding passage. Thus, the at least one pressure medium guiding passage may be arranged within the pressure vessel such that pressure medium may pass directly from the furnace chamber to the space between the furnace chamber and the bottom end closure via the at least one pressure medium guiding passage without needing to pass through the outer convection loop. The outer convection loop and the at least one pressure medium guiding passage may form a natural convection loop within the pressure vessel.

Each of the at least one pressure medium guiding passage of the press apparatus according to the first aspect of the present invention is arranged such that a cross-section thereof in a plane perpendicular to a flow direction of the pressure medium through the pressure medium guiding passage is formed as a gap (which might in alternative be referred to as a slit) having a width, wherein each of the at least one pressure medium guiding passage has a corresponding width, and wherein a sum of the width(s) (which width(s) may be referred to as the corresponding cross-section width(s)) is less than 4 mm.

There might be provided only one pressure medium guiding passage. In that case, the pressure medium guiding passage may be arranged such that a cross-section thereof in a plane perpendicular to a flow direction of the pressure medium through the pressure medium guiding passage is formed as a gap having a width less than 4 mm. If there are several pressure medium guiding passages, the total width of the corresponding cross-section widths (i.e. the sum of the corresponding cross-section widths) may be less than 4 mm. If there are several pressure medium guiding passages, the pressure medium guiding passages may be arranged in parallel, in the sense that pressure medium may pass directly from the furnace chamber to the space between the furnace chamber and the bottom end closure via any one of the pressure medium guiding passages without needing to pass through the outer convection loop and without needing to pass through the other one(s) of the pressure medium guiding passages.

The treatment cycle may comprise loading the article in the press apparatus, treating the article, and unloading the article from the press apparatus. The treatment cycle in addition to the cooling phase comprise other parts or phases, such as a pressing phase and/or a heating phase (which possibly may be combined in one phase), which may precede the cooling phase.

During a cooling phase, the pressure medium is, after having exited the furnace chamber, generally guided in the outer convection loop, where transfer of heat from the pressure medium to the outside of the pressure vessel generally takes place via the walls of the pressure vessel and also via end closure(s) of the pressure vessel, such as, for example, the top end closure. Thereby, the pressure medium is cooled before the pressure medium re-enters the furnace chamber by way of the transport of pressure medium from at least the space between the furnace chamber and the bottom end closure into the furnace chamber by means of the pressure medium flow generator. Thereby, the pressure medium in the treatment space may be cooled effectively.

The inventors have found that when the rate of cooling during a cooling phase is relatively high (e.g., 100° C./minute or higher in some types of hot isostatic presses), there may be a tendency for the pressure medium after having exited the furnace chamber to directly flow from the furnace chamber to the space between the furnace chamber and the bottom end closure via the at least one pressure medium guiding passage, without passing through the outer convection loop before the pressure medium enters the space between the furnace chamber and the bottom end and subsequently re-enters the furnace chamber. This may reduce the effectiveness of the cooling of the pressure medium in the treatment space, since the pressure medium in that case may not be guided in proximity to the inner surface(s) of walls and possibly also end closure(s) of the pressure vessel, where a substantial transfer of heat from the pressure medium to the outside of the pressure vessel may take place via the walls and possibly also end closure(s) of the pressure vessel. This may in turn reduce the rate of cooling of the pressure medium in the treatment space, which may be undesired.

The inventors have found that at very high rates of cooling during a cooling phase (e.g., 100° C./minute or higher in some types of hot isostatic presses), the resistance to flow of pressure medium guided in the outer convection loop after having exited the furnace chamber may become higher than the resistance to flow of pressure medium guided in the at least one pressure medium guiding passage directly after having exited the furnace chamber to the space between the furnace chamber and the bottom end closure (i.e. without passing through the outer convection loop in order to enter the space between the furnace chamber and the bottom end closure). The higher the rate of cooling of the pressure medium in the treatment space, the higher the resistance to flow of pressure medium guided in the outer convection loop after having exited the furnace chamber. The increase in resistance to flow of pressure medium guided in the outer convection loop after having exited the furnace chamber may be proportional (or approximately proportional) to the square of an increase in the rate of cooling of the pressure medium in the treatment space (i.e., an increase in the flow rate, or velocity, of the pressure medium in the outer convection loop). However, by arranging each of the at least one pressure medium guiding passage such that a cross-section thereof in a plane perpendicular to a flow direction of the pressure medium through the pressure medium guiding passage is formed as a gap having a width, wherein each of the at least one pressure medium guiding passage has a corresponding width, and wherein a sum of the width(s) is less than 4 mm, it may be facilitated or ensured that—even at very high rates of cooling during a cooling phase (e.g., 100° C./minute or higher in some types of hot isostatic presses)—the resistance to flow of pressure medium guided in the at least one pressure medium guiding passage directly after having exited the furnace chamber to the space between the furnace chamber and the bottom end closure becomes higher than the resistance to flow of pressure medium guided in the outer convection loop after having exited the furnace chamber. Thereby, the effectiveness of the cooling of the pressure medium in the treatment space may be kept relatively high even at very high rates of cooling, and any undesired reduction in the rate of cooling of the pressure medium in the treatment space may be alleviated or avoided. Thus, by each of the at least one pressure medium guiding passage being arranged such that a cross-section thereof in a plane perpendicular to a flow direction of the pressure medium through the pressure medium guiding passage is formed as a gap having a width, wherein each of the at least one pressure medium guiding passage has a corresponding width, and wherein a sum of the width(s) is less than 4 mm, a relatively high rate of cooling may be achieved.

Further, the cooling of the article may be carried out while the article is subjected to a relatively high pressure, which may be beneficial for the metallurgical properties of the treated article.

It can be noted that if the at least one pressure medium guiding passage would be completely restricted, so as to not allow for any pressure medium flow therethrough, there would be no tendency for the pressure medium after having exited the furnace chamber to directly flow from the furnace chamber to the space between the furnace chamber and the bottom end closure via the at least one pressure medium guiding passage without passing through the outer convection loop before the pressure medium enters the space between the furnace chamber and the bottom end and subsequently re-enters the furnace chamber. However, a complete restriction of the at least one pressure medium guiding passage is generally undesired, as that may completely or partially restrict a natural convection loop within the pressure vessel, which in turn may result in an increased moisture content within the pressure vessel, e.g., in or on parts forming the furnace chamber, in the phase(s) after the vacuum phase of the treatment cycle. A complete restriction of the at least one pressure medium guiding passage may lead to a reduced performance of any vacuum system that may be used in the press apparatus. It is beneficial to have a natural convection loop within the pressure vessel during the vacuum phase, because if the natural convection loop is closed during the vacuum phase, effectiveness of transport of any moisture in the pressure vessel away from the interior of the pressure vessel may be reduced. It is may also be desired to have a natural convection loop within the pressure vessel during heating or holding phases of the treatment cycle.

In the context of the present application, by a vacuum phase of a treatment cycle, it is meant an initial phase of the treatment cycle including, after having inserted the articles(s) to be treated in the pressure vessel, evacuating air and/or any other gas from the interior of the pressure vessel by means of one or more vacuum pumps.

It is to be noted that in applications where only relatively low rates of cooling during a cooling phase are sufficient or required (e.g., (much) lower than 100° C./minute), the press apparatus could be constructed such that the at least one pressure medium guiding passage has a larger size. For example, if the press apparatus would be constructed as a hot isostatic press with relatively large dimensions, and with intended operations involving cooling at rates that are relatively low, such a pressure medium guiding passage could be arranged such that a cross-section thereof in a plane perpendicular to a flow direction of the pressure medium through the pressure medium guiding passage is formed as a gap having a width of typically 50-100 mm. Using such a larger size of the pressure medium guiding passage would likely also make the assembly of the parts of the press apparatus in the construction thereof easier in view of allowable construction tolerances (different parts of the press apparatus may have little flexibility to accommodate variations in neighboring parts).

The pressure medium may for example comprise a gas, for example an inert gas such as Argon gas.

The pressure vessel may for example comprise a pressure cylinder (which may be referred to simply as a cylinder). The walls of the pressure vessel may comprise or be constituted by the cylinder-shaped walls of the pressure cylinder.

As described in the foregoing, by guiding pressure medium in proximity to the inner surface of walls and possibly end closure(s) of the pressure vessel, transfer of heat from the pressure medium to the outside of the pressure vessel may take place via the walls and possibly end closure(s) of the pressure vessel. During passage of pressure medium in the outer convection loop, transfer of heat from the pressure medium may take place also to other parts or portions of the pressure vessel which for example may be located in proximity to walls of the pressure vessel or an end closure of the pressure vessel, via which transfer of heat from the pressure medium to the outside of the pressure vessel may take place. Thus, the temperature of the pressure medium in the outer convection loop may be lower than the temperature of the pressure medium in the treatment region.

To increase the transfer of heat from the pressure medium guided in proximity to an inner surface of walls of the pressure vessel to the outside of the pressure vessel, the outer surface of the outer walls of the pressure vessel may be provided with channels, conduits or tubes, etc., which channels, conduits or tubes for example may be arranged so as to be in connection with the outer surface of the outer wall of the pressure vessel and may be arranged to run parallel to an axial direction of the pressure vessel or helically or spirally around the outer surface of the outer wall of the pressure vessel. A coolant for cooling of the walls of the pressure vessel may be provided in the channels, conduits or tubes, whereby the walls of the pressure vessel may be cooled in order to protect the walls from detrimental heat building up during operation of the pressure vessel. The coolant in the channels, conduits or tubes may for example comprise water, but another or other types of coolants are possible.

On the outside surface of the outer walls of the pressure cylinder, and possibly on any channels, conduits and/or tubes, etc. for coolant as described in the foregoing, pre-stressing means may be provided. The pre-stressing means may for example be provided in the form of wires (e.g., made of steel) wound in a plurality of turns so as to form one or more bands, and preferably in several layers, around the outside surface of the outer walls of the pressure vessel and possibly also any channels, conduits and/or tubes, etc. for coolant that may be provided thereon. The pre-stressing means may be arranged for exerting radial compressive forces on the pressure vessel.

In any one of the disclosed embodiments of the present invention, each of the at least one pressure medium guiding passage may for example be arranged such that it has a certain cross-sectional area thereof in a plane perpendicular to a flow direction of the pressure medium through the pressure medium guiding passage, wherein a sum of the cross-sectional area(s) is less than 25% of a cross-sectional area of the passage forming the outer convection loop in a plane perpendicular to a flow direction of the pressure medium through the outer convection loop (e.g., where the cross-sectional area of the passage forming the outer convection loop in a plane perpendicular to a flow direction of the pressure medium through the outer convection loop is the smallest, if the cross-sectional area varies along the length of the passage forming the outer convection loop).

Each of the at least one pressure medium guiding passage may for example be arranged such that a cross-section thereof in a plane perpendicular to a flow direction of the pressure medium through the pressure medium guiding passage is formed as a gap having a width, wherein each of the at least one pressure medium guiding passage has a corresponding width, and wherein a sum of the width(s) is in a range 0.1 mm to 3.5 mm, or 0.1 mm to 2.5 mm, or 0.1 mm to 1.5 mm. Thus, each of the at least one pressure medium guiding passage may for example be arranged such that a sum of the corresponding cross-section width(s) is in a range 0.1 mm to 3.5 mm, or 0.1 mm to 2.5 mm, or 0.1 mm to 1.5 mm.

Each of the at least one pressure medium guiding passage could be arranged such that a cross-section thereof in a plane perpendicular to a flow direction of the pressure medium through the pressure medium guiding passage is formed as a gap having a width, wherein each of the at least one pressure medium guiding passage has a corresponding width, and wherein a sum of the width(s) is 0.5 mm or less, such as 0.4 mm, 0.3 mm, 0.2 mm, or 0.1 mm. Thus, each of the at least one pressure medium guiding passage may for example be arranged such that a sum of the corresponding cross-section width(s) is 0.5 mm or less, such as 0.4 mm, 0.3 mm, 0.2 mm, or 0.1 mm.

The pressure medium flow generator may for example comprise one or more fans, ejectors and/or circulation means or the like. The pressure medium flow generator may be controllable at least with respect to the flow rate of pressure medium transported from at least the space between the furnace chamber and the bottom end closure into the furnace chamber. The rate of cooling of the pressure medium in the treatment space may be governed at least in part by the flow rate of pressure medium transported from at least the space between the furnace chamber and the bottom end closure into the furnace chamber.

Each of the at least one pressure medium guiding passage may be arranged such that a sum of the corresponding cross-section width(s) is based on estimated (or calculated, or determined) resistance to flow of pressure medium guided in the outer convection loop after having exited the furnace chamber at rates of cooling exceeding a selected rate of cooling threshold value, such that the corresponding cross-section width(s) causes (or entails, or provides for) a resistance to flow of pressure medium guided in the pressure medium guiding passage directly after having exited the furnace chamber (i.e. not having passed through the outer convection loop) to the space between the furnace chamber and the bottom end closure to become higher than the estimated resistance to flow of pressure medium guided in the outer convection loop after having exited the furnace chamber.

Thus, a size of the at least one pressure medium guiding passage may be selected based on estimated resistance to flow of pressure medium guided in the outer convection loop after having exited the furnace chamber at rates of cooling exceeding the selected rate of cooling threshold value. As mentioned, the higher the rate of cooling of the pressure medium in the treatment space, the higher the resistance to flow of pressure medium guided in the outer convection loop after having exited the furnace chamber. The increase in resistance to flow of pressure medium guided in the outer convection loop after having exited the furnace chamber may be proportional (or approximately proportional) to the square of an increase in the rate of cooling of the pressure medium in the treatment space.

The selected rate of cooling threshold value may for example be 100° C./minute or higher, e.g., 150° C./minute, 200° C./minute, or 500° C./minute or higher.

Resistance to flow of pressure medium guided in the outer convection loop after having exited the furnace chamber is generally caused by the friction of the outer layer of the pressure medium and the inner walls of the duct(s), pipe(s), channel(s) and/or passage(s) included in or constituting the outer convection loop and friction between the pressure medium layers within the pressure medium, which increases for turbulent flows in comparison to laminar flows where the layers do not mix. The resistance from the flow itself and the friction at the inner walls cause a pressure drop in the outer convection loop.

In order to estimate (or calculate, or determine) resistance to flow of pressure medium guided in the outer convection loop after having exited the furnace chamber, the pressure drop in the outer convection loop can for example be determined by means of a Moody chart, or Moody diagram. Assuming that the inner walls of the duct(s), pipe(s), channel(s) and/or passage(s) included in or constituting the outer convection loop can be considered as a circular pipe, a Moody chart can be used to relate the Darcy-Weisbach friction factor f, Reynolds number Re and surface roughness of the inner walls of the duct(s), pipe(s), channel(s) and/or passage(s) included in or constituting the outer convection loop to each other. The pressure drop in the outer convection loop is proportional to f. For a laminar flow regime, $f=64/Re$, but for a turbulent flow regime—which is generally the condition during a cooling phase—the relation between f, Re and the surface roughness is more complex. The relation between f, Re and the surface roughness for a turbulent flow regime can be modelled using different models.

If the rate of cooling of the pressure medium in the treatment space is increased, the flow rate of the pressure medium in the outer convection loop will increase, while the density of the pressure medium and f will generally decrease. An increase in the flow rate of the pressure medium in the outer convection loop will generally have a larger impact on the pressure drop in the outer convection loop than a change in other quantities such as f and the density of the pressure medium.

The gap(s) may be straight and/or curved. For example, the at least one pressure medium guiding passage may have one or more bends, turns, meanderings, etc., over the length thereof. Providing the at least one pressure medium guiding passage with one or more bends, turns, or meanderings may facilitate achieving a larger pressure drop in the at least one pressure medium guiding passage. An increase in the length of the at least one pressure medium guiding passage will generally result in an increase in the pressure drop in the at least one pressure medium guiding passage.

For example, each of the at least one pressure medium guiding passage may be arranged such that a cross-section thereof in a plane perpendicular to a flow direction of the pressure medium through the pressure medium guiding passage is formed as a gap having the shape of: at least part of a ring (e.g., at least part of a circular ring, or at least part of an elliptical ring), or a rectangle. In principle, different parts of the gap could have different shapes. The different shapes may include a part of a ring (e.g., a part of a circular ring, or a part of an elliptical ring), or a rectangle.

The pressure medium flow generator may be arranged to—at least during the cooling phase of the treatment cycle—generate a transport of pressure medium from another space in the press apparatus. The temperature of the pressure medium in the other space may be lower than the temperature of the pressure medium in the treatment space during at least part of the cooling phase, such that by transport of pressure medium during the cooling phase from the other space to the treatment space, the temperature of the pressure medium in the treatment space decreases.

The above-mentioned other space in the press apparatus may or may not be a space in the pressure vessel. The above-mentioned other space may for example be defined by a space or region within the pressure vessel that is different and possibly at a distance from the treatment space. As mentioned, the above-mentioned other space must not necessarily be a space within the pressure vessel, but the other space may be a space in the press apparatus outside the pressure vessel, such as, for example a space or region defined by a pressure medium source that is arranged outside the pressure vessel. The above-mentioned other space in the press apparatus may comprise at least a part of the outer convection loop.

The outer convection loop may be arranged to guide the pressure medium after having exited the furnace chamber to a space between the top end closure and the furnace chamber. The outer convection loop may be further be arranged to guide the pressure medium from the space between the top end closure and the furnace chamber in proximity to the inner surface of walls of the pressure vessel to the space between the furnace chamber and the bottom end closure.

The press apparatus may comprise a plurality of outer convection loop pressure medium guiding passages which may be in fluid communication with the furnace chamber and arranged to form the outer convection loop.

The furnace chamber may be at least partly enclosed by a heat insulated casing, which may be arranged so that pressure medium can enter and exit the furnace chamber. The heat insulated casing may comprise a heat insulating portion, a housing that may be at least partly enclosing the heat insulating portion, and possibly a bottom insulating portion.

A part of the outer convection loop may comprise a first outer convection loop pressure medium guiding passage, which may be formed between at least portions of the housing and the heat insulating portion, respectively, and which may be arranged to guide the pressure medium after having exited the furnace chamber to a space between the top end closure and the furnace chamber.

Another part of the outer convection loop may comprise a second outer convection loop pressure medium guiding passage, which may be arranged to guide the pressure medium from the space between the top end closure and the furnace chamber in proximity to the inner surface of walls of the pressure vessel to a space between the bottom insulating portion and the bottom end closure. The mentioned space between the bottom insulating portion and the bottom end closure may be constituting or be included in the mentioned space between the furnace chamber and the bottom end closure.

The at least one pressure medium guiding passage may be arranged such that pressure medium may pass from the furnace chamber to the space between the bottom insulating portion and the bottom end closure, or vice versa, via only the at least one pressure medium guiding passage.

The at least one pressure medium guiding passage may be at least in part defined by at least one gap formed between the bottom insulating portion and the housing. The at least one gap formed between the bottom insulating portion and the housing may for example be realized or implemented by one or more components arranged intermediate the bottom insulating portion and the housing. The one or more components may for example comprise one or more discs, rings and/or gaskets. For example, each or any of the one or more components may be attached only to the bottom insulating portion or only to the housing, or possibly to both the bottom insulating portion and the housing.

For example, the bottom insulating portion may comprise a plate-shaped member.

The at least one pressure medium guiding passage may be at least in part defined by at least one gap formed between an edge of the plate-shaped member and a surface of the housing.

The plate-shaped member may comprise a first outer surface, a second outer surface opposite to the first outer surface, and an edge surface extending between the first outer surface and the second outer surface. The bottom insulating portion may comprise a disc or a circular ring attached to one of the first outer surface and the second outer surface, wherein the disc or circular ring may be sized such that the disc or circular ring extends over at least a part of a boundary of the first outer surface or the second outer surface, possibly over the whole boundary of the first outer surface or the second outer surface. The at least one pressure medium guiding passage may at least in part be defined by a gap formed between an edge of the disc or circular ring and a surface of the housing.

The disc or circular ring and the plate-shaped member may be separate components. However, the disc or circular ring could be an integral part of the plate-shaped member.

The press apparatus may comprise a circular ring, which may be attached to a surface of the housing. The circular ring may be attached to the surface of the housing and sized such that the at least one pressure medium guiding passage is at least in part defined by a gap formed between the circular ring (e.g., an edge thereof) and the bottom insulating portion.

The press apparatus may comprise a gasket, which may be, e.g., in the shape of a circular ring. The gasket may be arranged intermediate a surface of the housing and the bottom insulating portion. An outer gasket edge may be connected to the surface of the housing. An inner gasket edge may be connected to the bottom insulating portion. The at least one pressure medium guiding passage may be at least in part defined by a gap formed in the gasket. Possibly, the gasket may not be connected to both the housing and the bottom insulating portion. For example, the outer gasket edge may be connected to the surface of the housing, but the inner gasket edge may not be connected to the bottom insulating portion. According to another example, the inner gasket edge may be connected to the bottom insulating portion, but the outer gasket edge may not be connected to the surface of the housing.

According to a second aspect of the present invention, a press apparatus is provided. The press apparatus comprises a pressure vessel, which is arranged to hold pressure medium therein during use of the press apparatus. The pressure vessel comprises a top end closure and a bottom end closure. The press apparatus comprises a furnace chamber, which is arranged within the pressure vessel so that pressure medium can enter and exit the furnace chamber. The furnace chamber is at least in part defining a treatment space arranged to accommodate at least one article. The press apparatus is configured to subject the at least one article to a treatment cycle including a cooling phase. The press apparatus comprises at least one outer convection loop pressure medium guiding passage in fluid communication with the furnace chamber and arranged to form an outer convection loop within the pressure vessel. The outer convection loop is arranged to guide the pressure medium after having exited the furnace chamber in proximity to an inner surface of wall(s) of the pressure vessel to a space between the furnace chamber and the bottom end closure. The press apparatus comprises a pressure medium flow generator, which is arranged within the pressure vessel and in fluid communication with the furnace chamber. At least during a cooling phase of the treatment cycle, the pressure medium flow generator is arranged to generate a transport of pressure medium from at least the space between the furnace chamber and the bottom end closure into the furnace chamber so as to cool the pressure medium in the treatment space. The press apparatus comprises at least one pressure medium guiding passage arranged within the pressure vessel such that pressure medium may pass from the furnace chamber to the space between the furnace chamber and the bottom end closure, or vice versa, via only the at least one pressure medium guiding passage.

The press apparatus according to the second aspect of the present invention comprises one or more controllable pressure medium flow restrictions, which is or are arranged to selectively and controllably impede or obstruct a flow of pressure medium in the at least one pressure medium passage. The press apparatus comprises a control unit, which is communicatively connected with the one or more controllable pressure medium flow restrictions for controlling operation thereof. The control unit is configured to control the one or more controllable pressure medium flow restrictions so as to impede or obstruct a flow of pressure medium in the at least one pressure medium guiding passage during a cooling phase of the treatment cycle and not impede or obstruct a flow of pressure medium in the at least one pressure medium guiding passage during another or other phases of the treatment cycle including at least one of a heating phase, a hold phase, a pumping phase (e.g., a pressure medium pumping phase) and a vacuum phase, or any combination thereof (wherein two or possibly more phases occur concurrently, such as, for example, a combined pumping and heating phase, where pumping and heating occur concurrently.

By impeding or obstructing a flow of pressure medium in the at least one pressure medium guiding passage during a cooling phase (e.g., completely, or substantially completely, impeding or obstructing flow of pressure medium in the at least one pressure medium passage), it may be significantly alleviated or avoided that the pressure medium after having exited the furnace chamber flows directly from the furnace chamber to the space between the furnace chamber and the bottom end closure via the at least one pressure medium guiding passage, without passing through the outer convection loop before the pressure medium enters the space between the furnace chamber and the bottom end and subsequently re-enters the furnace chamber. Further, by not impeding or obstructing a flow of pressure medium in the at least one pressure medium guiding passage during another or other phases, including at least one of a heating phase and a vacuum phase, it can be ensured that there is a natural convection loop within the pressure vessel during, e.g., a heating phase, a hold phase, a pumping phase and/or a vacuum phase.

The controllable pressure medium flow restriction(s) may for example comprise one or more adjustable throttles. The one or more adjustable throttles may for example be arranged in or on the at least one pressure medium guiding passage. For example, an adjustable throttle may be arranged in or on each of the at least one pressure medium guiding passage. In alternative or in addition, the controllable pressure medium flow restriction(s) may comprise one or more adjustable valves, such as, for example, one or more solenoid valves. In alternative or in addition another or other types of valves may be used, e.g., pneumatic valves and/or motor operated valves. It may be desired to employ a plurality of adjustable valves (or other type of controllable pressure medium flow restriction(s)), since that may facilitate achieving a uniform flow of pressure medium through the at least one pressure medium guiding passage.

The control unit may for example include or be constituted by any suitable central processing unit (CPU), microcontroller, digital signal processor (DSP), Application Specific Integrated Circuit (ASIC), Field Programmable Gate Array (FPGA), etc., or any combination thereof. The control unit may optionally be capable of executing software instructions stored in a computer program product e.g. in the form of a memory. The memory may for example be any combination of read and write memory (RAM) and read only memory (ROM). The memory may comprise persistent storage, which for example can be a magnetic memory, an optical memory, a solid state memory or a remotely mounted memory, or any combination thereof.

The communicative coupling between the control unit and the one or more controllable pressure medium flow restrictions may be realized or implemented for example by means of any appropriate wired and/or wireless communication means or techniques as known in the art.

According to a third aspect of the present invention, a method in a press apparatus is provided. The press apparatus comprises a pressure vessel, which is arranged to hold pressure medium therein during use of the press apparatus. The pressure vessel comprises a top end closure and a bottom end closure. The press apparatus comprises a furnace chamber, which is arranged within the pressure vessel so that pressure medium can enter and exit the furnace chamber. The furnace chamber is at least in part defining a treatment space arranged to accommodate at least one article. The press apparatus is configured to subject the at least one article to a treatment cycle including a cooling phase. The press apparatus comprises at least one outer convection loop pressure medium guiding passage in fluid communication with the furnace chamber and arranged to form an outer convection loop within the pressure vessel. The outer convection loop is arranged to guide the pressure medium after having exited the furnace chamber in proximity to an inner surface of wall(s) of the pressure vessel to a space between the furnace chamber and the bottom end closure. The press apparatus comprises a pressure medium flow generator, which is arranged within the pressure vessel and in fluid communication with the furnace chamber. At least during a cooling phase of the treatment cycle, the pressure medium flow generator is arranged to generate a transport of pressure medium from at least the space between the furnace chamber and the bottom end closure into the furnace chamber so as to cool the pressure medium in the treatment space. The press apparatus comprises at least one pressure medium guiding passage arranged within the pressure vessel such that pressure medium may pass from the furnace chamber to the space between the furnace chamber and the bottom end closure, or vice versa, via only the at least one pressure medium guiding passage. The press apparatus comprises one or more controllable pressure medium flow restrictions, which is or are arranged to selectively and controllably impede or obstruct a flow of pressure medium in the at least one pressure medium passage.

The method according to the third aspect of the present invention comprises controlling the one or more controllable pressure medium flow restrictions so as to impede or obstruct a flow of pressure medium in the at least one pressure medium guiding passage during a cooling phase of the treatment cycle and not impede or obstruct a flow of pressure medium in the at least one pressure medium guiding passage during another or other phases of the treatment cycle including at least one of a heating phase, a hold phase, a pumping phase and a vacuum phase, or any combination thereof (wherein two or possibly more phases occur concurrently, such as, for example, a combined pumping and heating phase, where pumping and heating occur concurrently).

According to a fourth aspect of the present invention, a computer program is provided. The computer program comprises instructions, which when executed by one or more processors comprised in a control unit, cause the control unit to perform the method according to the third aspect of the present invention.

According to a fifth aspect of the present invention, a processor-readable medium is provided. The processor-readable medium has a computer program loaded thereon, wherein the computer program comprises instructions, which, when executed by one or more processors comprised in a control unit, cause the control unit to perform the method according to the third aspect of the present invention.

Each or any of the one or more processors may for example comprise a CPU, a microcontroller, a DSP, an ASIC, an FPGA, etc., or any combination thereof. The processor-readable medium may for example include a Digital Versatile Disc (DVD) or a floppy disk or any other suitable type of processor-readable means or processor-readable (digital) medium, such as, but not limited to, a memory such as, for example, nonvolatile memory, a hard disk drive, a Compact Disc (CD), a Flash memory, magnetic tape, a Universal Serial Bus (USB) memory device, a Zip drive, etc.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the present invention will be described below with reference to the accompanying drawings.

Each of FIGS. 1 to 4 is a schematic, in part sectional, side view of a press apparatus according to an embodiment of the present invention.

The figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are illustrated. The present invention may, however, be embodied in many different forms and should not be construed as limited to the embodiments of the present invention set forth herein; rather, these embodiments are provided by way of example so that this disclosure will convey the scope of the present invention to those skilled in the art.

Figure 1:
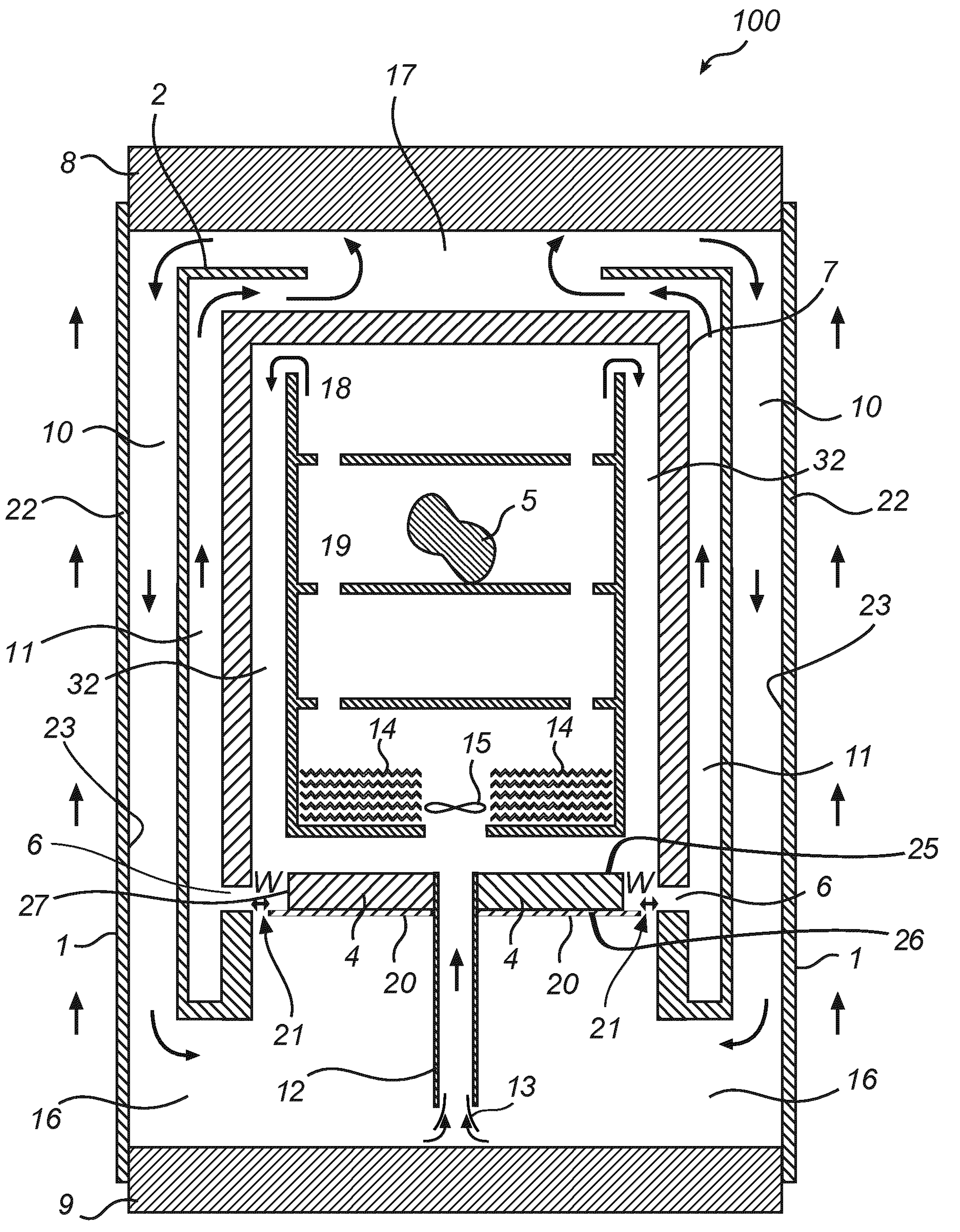

FIG. 1 is a schematic, in part sectional, side view of a press apparatus 100 according to an embodiment of the present invention. The press apparatus 100 is arranged for treatment of at least one article by means of pressing, for example by means of hot pressing such as hot isostatic pressing (HIP).

The press apparatus 100 comprises a pressure vessel, which comprises a pressure cylinder 1 and a top end closure 8 and a bottom end closure 9, or more generally a first end closure and a second end closure, respectively. It is to be understood that the pressure vessel—which will be collectively referred to in the following by way of the reference numerals 1, 8 and 9—may comprise additional parts, components or elements not illustrated in FIG. 1. The pressure vessel 1, 8, 9 is arranged to hold pressure medium therein during use of the press apparatus 100.

The pressure vessel 1, 8, 9 comprises a furnace chamber 18. The furnace chamber 18 is arranged within the pressure vessel 1, 8, 9 so that pressure medium can enter and exit the furnace chamber 18. The furnace chamber 18 may comprise a furnace, or heater or heating elements, for heating of the pressure medium in the pressure vessel for example during a pressing phase of a treatment cycle. The furnace is schematically indicated in FIG. 1 by the reference numerals 14. Parts of the furnace 14 are illustrated in FIG. 1 as two identical elements indicated by the reference numerals 14. It is however to be understood that the furnace 14 could be provided in in principle any number of parts, and not only two parts as illustrated in FIG. 1, but fewer or more than two parts. In accordance with the embodiment of the present invention illustrated in FIG. 1, the furnace 14 is arranged at a lower part of the furnace chamber 18. It is to be understood that different configurations and arrangements of the furnace 14 in relation to, e.g., within, the furnace chamber 18 are possible. For example, in alternative or in addition to the arrangement of the furnace 14 illustrated in FIG. 1, the furnace 14 could be arranged at an upper part of the furnace chamber 18, such as, for example, in pressure medium guiding passage 32 shown in FIG. 1, which will be described further in the following. Any implementation of the furnace 14 with regards to arrangement thereof in relation to, e.g., within, the furnace chamber 18 may be used in any one of the embodiments of the present invention disclosed herein. In the context of the present application, the term “furnace” refers to the elements or means for providing heating, while the term “furnace chamber” refers to the area or region in which the furnace and possibly a load compartment and any article are located. As illustrated in FIG. 1, the furnace chamber 18 may not occupy the whole inner space of the pressure vessel 1, 8, 9, but may leave an intermediate space 10 of the interior of the pressure vessel 1, 8, 9 around the furnace chamber 18. The intermediate space 10 forms a pressure medium guiding passage 10. During operation of the press apparatus 100, the temperature in the intermediate space 10 may be lower than the temperature in the furnace chamber 18, but the intermediate space 10 and the furnace chamber 18 may be at equal, or substantially equal, pressure.

The pressure vessel 1, 8, 9 includes a treatment space therein. The treatment space may for example be at least in part defined by the furnace chamber 18. For example, the treatment space may be comprised or constituted by an interior of the furnace chamber 18. The treatment space is arranged to accommodate an article 5 (or possibly several articles). In accordance with the embodiment of the present invention illustrated in FIG. 1, a load compartment 19 included in the furnace chamber 18 is arranged to accommodate the article 5. The treatment space may be comprised or constituted by an interior of the load compartment 19. The press apparatus 100 is configured to subject the article 5 to a treatment cycle, which treatment cycle includes a cooling phase.

The outer surface of the outer walls of the pressure vessel 1, 8, 9 may be provided with channels, conduits or tubes, etc. (not shown in FIG. 1), which channels, conduits or tubes for example may be arranged so as to be in connection with the outer surface of the outer wall of the pressure vessel 1, 8, 9, and which may be arranged to run parallel to an axial direction of the pressure vessel 1, 8, 9 or helically or spirally around the outer surface of the outer wall of the pressure vessel 1, 8, 9. A coolant for cooling of the walls of the pressure vessel 1, 8, 9 may be provided in the channels, conduits or tubes, whereby the walls of the pressure vessel 1, 8, 9 may be cooled in order to protect the walls from detrimental heat building up during operation of the pressure vessel 1, 8, 9. The coolant in the channels, conduits or tubes may for example comprise water, but another or other types of coolants are possible. An exemplifying flow of coolant in channels, conduits or tubes provided on the outer surface of the outer walls of the pressure vessel 1, 8, 9 is indicated in FIG. 1 by the arrows on the outside of the pressure vessel 1, 8, 9.

On the outside surface of the outer walls of the pressure cylinder 1, and possibly on any channels, conduits and/or tubes, etc. for coolant as described in the foregoing, pre-stressing means may be provided. The pre-stressing means (not shown in FIG. 1) may for example be provided in the form of wires (e.g., made of steel) wound in a plurality of turns so as to form one or more bands, and preferably in several layers, around the outside surface of the outer walls of the pressure cylinder 1 and possibly also any channels, conduits and/or tubes, etc. for coolant that may be provided thereon. The pre-stressing means may be arranged for exerting radial compressive forces on the pressure cylinder 1.

Even though it is not explicitly indicated in FIG. 1, the pressure vessel 1, 8, 9 may be arranged such that it can be opened and closed, such that any article within the pressure vessel 1, 8, 9 may be inserted or removed. An arrangement of the pressure vessel 1, 8, 9 such that it can be opened and closed may be realized in a number of different manners, as known in the art. Although not explicitly indicated in FIG. 1, one or both of the top end closure 8 and the bottom end closure 9 may be arranged so that it or they can be opened and closed.

As will be described in more detail in the following, the press apparatus 100 comprises outer convection loop pressure medium guiding passages 10, 11, which are in fluid communication with the furnace chamber 18 and arranged to form an outer convection loop within the pressure vessel 1, 8, 9. The outer convection loop is arranged to guide the pressure medium after having exited the furnace chamber 18 in proximity to an inner surface 23 of wall(s) 22 of the pressure vessel 1, 8, 9 to a space 16 between the furnace chamber 18 and the bottom end closure 9. As indicated in FIG. 1, the wall(s) 22 of the pressure vessel 1, 8, 9 may be the outer wall(s) of the pressure vessel 1, 8, 9.

In accordance with the embodiment of the present invention illustrated in FIG. 1, the furnace chamber 18 is enclosed by a heat insulated casing—which will be collectively referred to in the following by way of the reference numerals 2, 4 and 7—and is arranged so that pressure medium can enter and exit the furnace chamber 18. Further in accordance with the embodiment of the present invention illustrated in FIG. 1, the heat insulated casing 2, 4, 7 comprises a heat insulating portion 7, a housing 2 which is partly enclosing the heat insulating portion 7, and a bottom insulating portion 4. Not all of the elements of the heat insulated casing 2, 4, 7 may be arranged so as to be heat insulated or heat insulating. For example, the housing 2 may not necessarily be arranged so as to be heat insulated or heat insulating. The heat insulated casing 2, 4, 7 surrounding the furnace chamber 18 is likely to save energy during a heating phase of the treatment cycle to which the press apparatus 100 may be configured to subject the article 5 to. The heat insulated casing 2, 4, 7 may also facilitate or ensure that convection takes place in a more ordered manner. Because of the vertically elongated shape of the furnace chamber 18 in the illustrated embodiment of the present invention, the heat insulated casing 2, 4, 7 may prevent forming of temperature gradients, such as horizontal temperature gradients, which may be difficult to monitor and control.

In accordance with the embodiment of the present invention illustrated in FIG. 1, a part of the outer convection loop comprises a first outer convection loop pressure medium guiding passage 11, formed between portions of the housing 2 and the heat insulating portion 7, respectively, and which is arranged to guide the pressure medium after having exited the furnace chamber 18 to a space 17 between the top end closure 8 and the furnace chamber 18. Further in accordance with the embodiment of the present invention illustrated in FIG. 1, another part of the outer convection loop comprises a second outer convection loop pressure medium guiding passage, which according to the illustrated embodiment is constituted by the pressure medium guiding passage 10. The second outer convection loop pressure medium guiding passage 10 is arranged to guide the pressure medium from the space 17 between the top end closure 8 and the furnace chamber 18 in proximity to the inner surface 23 of wall(s) 22 of the pressure vessel 1, 8, 9 to a space between the bottom insulating portion 4 and the bottom end closure 9. In accordance with the embodiment of the present invention illustrated in FIG. 1, the mentioned space between the bottom insulating portion 4 and the bottom end closure 9 is constituting the above-mentioned space 16 between the furnace chamber 18 and the bottom end closure 9.

The pressure medium used in the pressure vessel 1, 8, 9 or press apparatus 100 may for example comprise or be constituted by a liquid or gaseous medium which may have a relatively low chemical affinity in relation to the article(s) to be treated in the pressure vessel 1, 8, 9. The pressure medium may for example comprise a gas, for example an inert gas such as Argon gas.

As indicated in FIG. 1, the pressure medium may exit the load compartment 19 at a top portion thereof and subsequently be guided in a pressure medium guiding passage 32 between the walls of the load compartment 19 and the heat insulating portion 7, after which the pressure medium may enter into the pressure medium guiding passage 11 by way of opening(s) 6 between the heat insulating portion 7 and the housing 2. The opening(s) 6 between the heat insulating portion 7 and the housing 2 may be at or approximately at the level of the bottom insulating portion 4, as illustrated in FIG. 1. It is however to be understood that the opening(s) 6 between the heat insulating portion 7 and the housing 2 may be at a different location than illustrated in FIG. 1. This applies to any of the disclosed embodiments of the present invention, such as the embodiments of the present invention illustrated in the figures. The opening(s) 6 between the heat insulating portion 7 and the housing 2 may possibly be provided with one or more valves or any other type of adjustable throttle or controllable pressure medium flow restriction means.

The pressure medium that enters into the pressure medium guiding passage 11 by way of the opening(s) between the heat insulating portion 7 and the housing 2 is guided in the pressure medium guiding passage 11 towards the top end closure 8 where it may exit the pressure medium guiding passage 11 and the heat insulated casing 2, 4, 7 by way of an opening in the housing 2, e.g., a central opening in the housing 2, as illustrated in FIG. 1.

A pressure medium guiding passage defined by the space 17 in part defined by the inner surface of the top end closure 8 and the pressure medium guiding passage 10 is arranged to guide the pressure medium having exited the opening in the housing 2 in proximity to the top end closure 8 and in proximity to an inner surface 23 of wall(s) 22 of the pressure vessel 1, 8, 9 (e.g., the wall(s) of the pressure cylinder 1, respectively, as illustrated in FIG. 1) to the space 16 between the furnace chamber 18 and the bottom end closure 9.

It is to be understood that FIG. 1 illustrates an exemplifying embodiment of the present invention, and that variations are possible, e.g., with respect to how the pressure medium is guided within the pressure vessel 1, 8, 9. For example, between the opening in the housing 2 and the upper part of the heat insulating portion 7 there could be provided a heat absorbing element as disclosed in WO 2018/171884 A1, such as a heat absorbing body indicated by reference numeral 20 and as illustrated in the figures in WO 2018/171884 A1. In alternative or in addition, there could for example be provided a heat exchanging element as disclosed in WO 2019/149379 A1 arranged in the top end closure 8, such as a heat exchanging element indicated by reference numeral 170 and as illustrated in the figures in WO 2019/149379 A1.

Thus, an outer convection loop may be formed by at least the pressure medium guiding passage 10 and the pressure medium guiding passage 11. In a part of the outer convection loop, the pressure medium is guided in proximity to the inner surface of the top end closure 8 and the inner surface 23 of wall(s) 22 of the pressure vessel 1, 8, 9, or pressure cylinder 1. The amount of thermal energy which may be transferred from the pressure medium during its passage in proximity to inner surfaces of the top end closure 8 and the inner surface 23 of walls 22 of the pressure vessel 1, 8, 9, or the pressure cylinder 1, may depend on at least one of the following: the speed of the pressure medium, the amount of pressure medium having (direct) contact with the inner surface of the top end closure 8 and the inner surface 23 of walls 22 of the pressure vessel 1, 8, 9, or the pressure cylinder 1, the relative temperature difference between the pressure medium and the inner surface of the top end closure 8 and the inner surface 23 of walls 22 of the pressure vessel 1, 8, 9, or the pressure cylinder 1, the thickness of the top end closure 8 and the thickness of walls 22 of the pressure vessel 1, 8, 9, or the pressure cylinder 1, and the temperature of any flow of coolant in channels, conduits or tubes provided on the outer surface of walls 22 of the pressure vessel 1, 8, 9, or the pressure cylinder 1 (indicated in FIG. 1 by the arrows on the outside of the pressure cylinder 1).

The pressure medium that is guided in the pressure medium guiding passage 10 back towards the furnace chamber 18 enters the space 16 between the furnace chamber 18—or the bottom insulating portion 4—and the bottom end closure 9. The furnace chamber 18 may be arranged so that pressure medium can enter the furnace chamber 18 from, and exit the furnace chamber 18 into, the space 16. For example, and in accordance with the embodiment of the present invention illustrated in FIG. 1, the furnace chamber 18 may be provided with an opening in the bottom insulating portion 4 permitting pressure medium to flow into (or out of) the furnace chamber 18. Further in accordance with the embodiment of the present invention illustrated in FIG. 1, a pressure medium guiding passage 12, e.g., comprising a conduit 12, is arranged so as to extend through the bottom insulating portion 4, with a lower (or first) opening of the pressure medium guiding passage or conduit 12 below the bottom insulating portion 4 (and possibly within the space 16, as per the illustrated embodiment) and an upper (or second) opening of the pressure medium guiding passage or conduit 12 at an upper surface of the bottom insulating portion 4 (and possibly aligned with an opening in the load compartment 19, as per the illustrated embodiment). The lower (or first) opening of the pressure medium guiding passage or conduit 12 may for example be provided with adjustable pressure medium flow restriction means such as one or more adjustable throttles or valves. Possibly, the upper (or second) opening of the pressure medium guiding passage or conduit 12 could be at a distance from the upper surface of the bottom insulating portion 4.

The pressure medium guiding passage 32 of the furnace chamber 18 and the pressure medium guiding passage formed between the load compartment 19 and the bottom insulating portion 4 are in fluid communication with the load compartment 19 so as to in part form an inner convection loop, wherein pressure medium in the inner convection loop is guided through the load compartment 19 and through the pressure medium guiding passage 32 of the furnace chamber 18 and the pressure medium guiding passage formed between the load compartment 19 and the bottom insulating portion 4 and back to the load compartment 19, or vice versa.

In accordance with the embodiment of the present invention illustrated in FIG. 1 the press apparatus 100 comprises a pressure medium circulation flow generator 15, which is configured to provide a circulation of pressure medium within the pressure vessel 1, 8, 9, wherein during the circulation of the pressure medium, the pressure medium passes through the furnace chamber 18. The pressure medium flow generator 15 is optional and may be omitted. In accordance with the embodiment of the present invention illustrated in FIG. 1, the pressure medium circulation flow generator 15 comprises a fan 15 or the like for circulation of pressure medium within the furnace chamber 18. In alternative or in addition, the pressure medium circulation flow generator 15 could comprise another or other types of pressure medium circulation flow generators than a fan, such as, for example, one or more ejectors. Further in accordance with the embodiment of the present invention illustrated in FIG. 1, the pressure medium circulation flow generator 15 may for example be arranged at an opening in the load compartment 19 above the bottom insulating portion 4, which openings permits pressure medium flow into or out of the load compartment 19. The pressure medium circulation flow generator 15 may be controllable at least with respect to operating rate thereof. The operating rate of the pressure medium circulation flow generator 15 could for example comprise a number of revolutions per minute (rpm) of the pressure medium circulation flow generator 15, such as if it comprises or is constituted by one or more fans, etc., but another or other types of operating rates are contemplated, depending on the nature of the particular implementation of the pressure medium circulation flow generator 15. The pressure medium circulation flow generator 15 may be configured to selectively control the flow rate of pressure medium in the above-mentioned inner convection loop.

The press apparatus 100 may comprise a pressure medium flow generator 13 arranged within the pressure vessel 1, 8, 9 and in fluid communication with the furnace chamber 18. At least during a cooling phase of the treatment cycle, the pressure medium flow generator 13 may be arranged to generate a transport of pressure medium from at least the space 16 between the furnace chamber 18 and the bottom end closure 4 into the furnace chamber 18 so as to cool the pressure medium in the treatment space.

According to the embodiment of the present invention illustrated in FIG. 1, the pressure medium flow generator 13 comprises an ejector arrangement 13, which is only schematically illustrated in FIG. 1. As illustrated in FIG. 1, pressure medium from the pressure medium guiding passage 10 which enters the space 16 may be drawn into the pressure medium flow generator 13 and subsequently be ejected from the flow generator 13 into the pressure medium guiding passage or conduit 12, which may then transport the pressure medium to the furnace chamber 18. The pressure medium flow generator 13—for example comprising an ejector arrangement 13—may comprise a single stage ejector, or a multi-stage ejector (e.g., a two-stage ejector). By a single-stage ejector, it is meant that the pressure medium flow generator 13 or ejector arrangement 13 comprises one flow generator or ejector. By a multi-stage ejector, it is meant that the pressure medium flow generator 13 or ejector arrangement 13 comprises a plurality of flow generators or ejectors, which are arranged so that the output from at least one flow generator or ejector is input to another flow generator or ejector. The plurality of flow generators or ejectors may for example be arranged in series. For example, the pressure medium flow generator 13 or ejector arrangement 13 may comprise a primary flow generator or ejector and a secondary flow generator or ejector, wherein the primary flow generator or ejector is arranged to draw pressure medium from the pressure medium guiding passage 10 which enters the space 16 into the primary flow generator or ejector. The output from the primary flow generator or ejector may be input into the secondary flow generator or ejector, and the output from the secondary flow generator or ejector may be ejected into the pressure medium guiding passage or conduit 12. In alternative or in addition, the pressure medium flow generator 13 could for example comprise one or more fans, pumps, or the like, which may be arranged to cause a flow of pressure medium into the pressure medium guiding passage or conduit 12.

The press apparatus 100 comprises at least one pressure medium guiding passage 21 arranged within the pressure vessel 1, 8, 9 such that pressure medium may pass from the furnace chamber 18 to the space 16 between the furnace chamber 18 and the bottom end closure 9, or vice versa, via only the at least one pressure medium guiding passage 21. Each of the at least one pressure medium guiding passage 21 is arranged such that a cross-section thereof in a plane perpendicular to a flow direction of the pressure medium through the pressure medium guiding passage 21 is formed as a gap having a width W, wherein each of the at least one pressure medium guiding passage 21 has a corresponding width, and wherein a sum of the width(s) is less than 4 mm.

According to the embodiment of the present invention illustrated in FIG. 1, there is a single such pressure medium guiding passage 21 arranged in the pressure vessel 1, 8, 9. (In this regard, it is noted that pressure vessel 1, 8, 9 has a cylindrical geometry.) In this case, the pressure medium guiding passage 21 is arranged such that a cross-section thereof in a plane perpendicular to a flow direction of the pressure medium through the pressure medium guiding passage 21 is formed as a gap having a width less than 4 mm. If there would be several such pressure medium guiding passages arranged in the pressure vessel 1, 8, 9, the total width of the corresponding cross-section widths (i.e. the sum of the corresponding cross-section widths) may be less than 4 mm.

The dimensions of other parts of the press apparatus 100 may vary and may depend on the particular type of press apparatus. The pressure vessel 1, 8, 9 illustrated in FIG. 1 has a cylindrical geometry. According to a non-limiting example, an inner diameter of the pressure cylinder 1 may be approximately 600 mm. A width of the pressure medium guiding passage 11 may be approximately 10 mm, and a width of the pressure medium guiding passage 10 may also be approximately 10 mm. An inner diameter of the heat insulating portion 7 may be approximately 500 mm. It is to be understood that these dimensions are exemplary and non-limiting, and may vary between different types of press apparatuses.

As illustrated in FIG. 1, the pressure medium guiding passage 21 is arranged such that pressure medium may pass from the furnace chamber 18 to the space 16 between the bottom insulating portion 4 and the bottom end closure 9, or vice versa, via only the pressure medium guiding passage 21. That the pressure medium may pass from the furnace chamber 18 to the space 16, or vice versa, via only the pressure medium guiding passage 21 means that the pressure medium does not need to pass through the outer convection loop in order to go from the furnace chamber 18 to the space 16, or vice versa, if the pressure medium goes via the pressure medium guiding passage 21.

According to the embodiment of the present invention illustrated in FIG. 1, the bottom insulating portion 4 comprises a plate-shaped member, comprising a first outer surface 25, a second outer surface 26 opposite to the first outer surface, an edge surface 27 extending between the first outer surface 25 and the second outer surface 26, and a disc 20 attached to the second outer surface 26 (or possibly instead to the first outer surface 25). The disc 20 may be attached to the second outer surface 26 (or possibly instead to the first outer surface 25) for example by means of welding. The disc 20 is sized such that it extends over at least a part of a boundary of the second outer surface 26 (or possibly instead the first outer surface 25). As illustrated in FIG. 1, the pressure medium guiding passage 21 is defined by a gap formed between an edge of the disc 20 and a surface of the housing 2. Instead of a disc 20, there may be provided a circular ring. Further, the disc (or circular ring) and the plate-shaped member may not be separate components, but the disc (or circular ring) could be an integral part of the plate-shaped member. As illustrated in FIG. 1, the disc 20 (or circular ring) may not be attached to the housing 2 or the heat insulating portion 7.

It is to be understood that the pressure medium guiding passage 21 illustrated in FIG. 1 is exemplifying and that the pressure medium guiding passage could be realized in different ways. For example, the pressure medium guiding passage 21 could be defined by a gap formed between the bottom insulating portion 4 and the housing 2. More particularly, the bottom insulating portion 4 could comprise a plate-shaped member, and the pressure medium guiding passage 21 could be defined by a gap formed between an edge of the plate-shaped member and a surface of the housing 2. Other exemplifying realizations of the pressure medium guiding passage 21 are illustrated in and described with reference to FIGS. 2 and 3.

Figure 2:
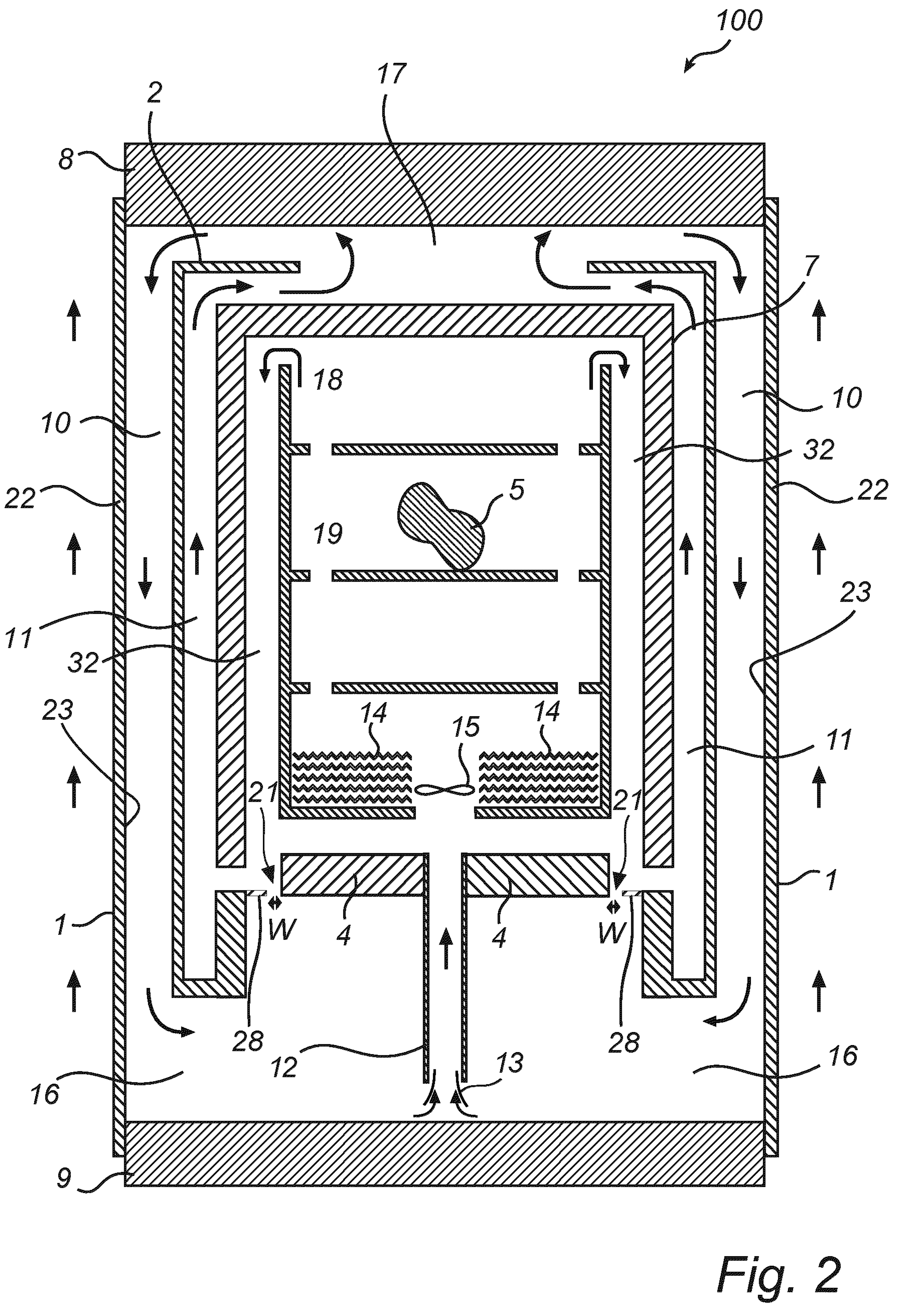

FIG. 2 is a schematic, in part sectional, side view of a press apparatus 100 according to an embodiment of the present invention. The press apparatus 100 illustrated in FIG. 2 is similar to the press apparatus 100 illustrated in FIG. 1, and the same reference numerals in FIGS. 1 and 2 denote the same or similar components, having the same or similar function. Compared to the press apparatus 100 illustrated in FIG. 1, the press apparatus 100 illustrated in FIG. 2 has a different realization of the pressure medium guiding passage 21. The press apparatus 100 illustrated in FIG. 2 comprises a circular ring 28, which is attached to a surface of the housing 2. The circular ring 28 is attached to the surface of the housing 2 (e.g., by means of screwing or welding) and sized such that the pressure medium guiding passage 21 is defined by a gap formed between the circular ring 28 and the bottom insulating portion 4. As illustrated in FIG. 2, the circular ring 28 may not be attached to the bottom insulating portion 4.

Figure 3:
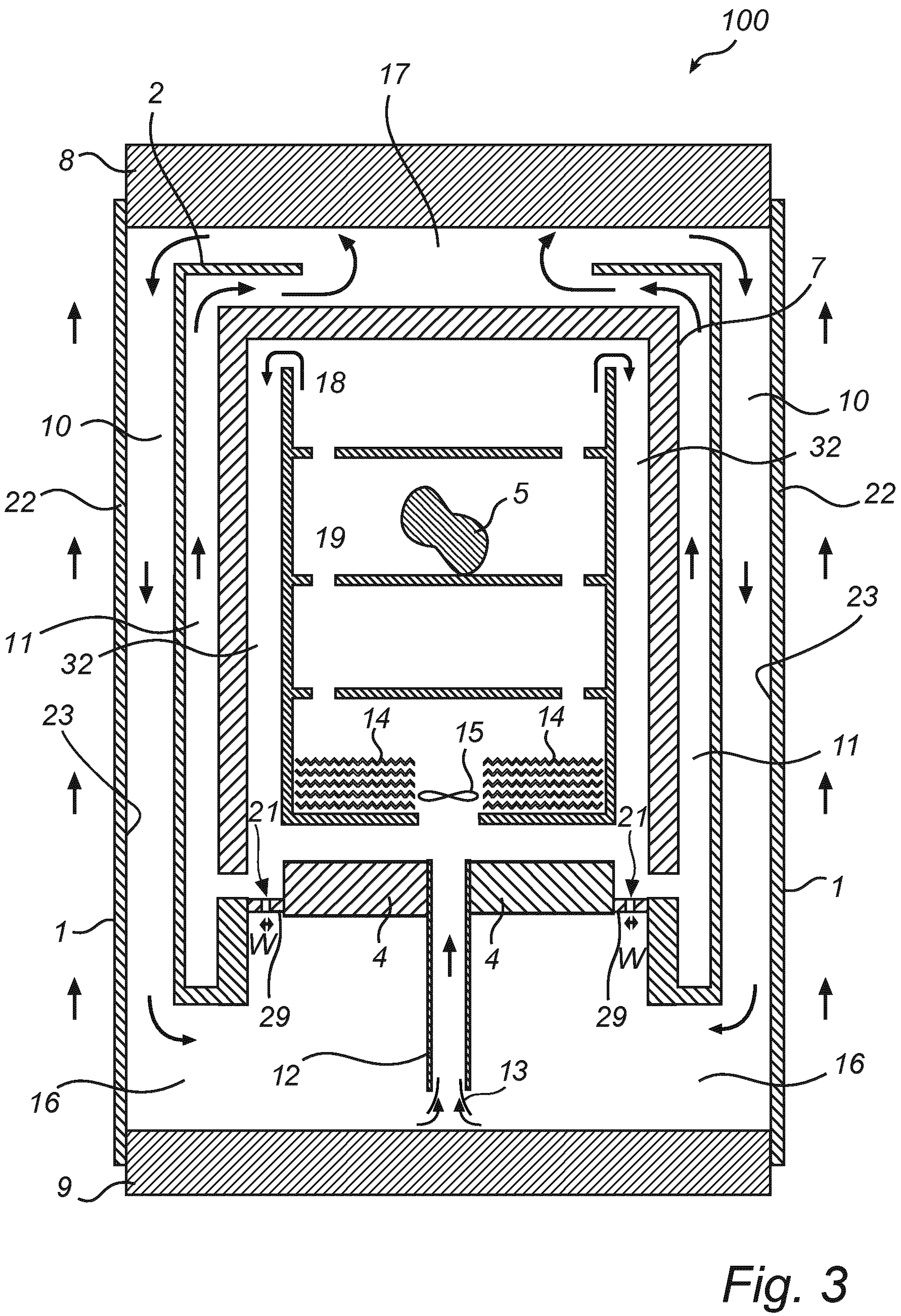

FIG. 3 is a schematic, in part sectional, side view of a press apparatus 100 according to an embodiment of the present invention. The press apparatus 100 illustrated in FIG. 3 is similar to the press apparatus 100 illustrated in FIG. 1, and the same reference numerals in FIGS. 1 and 3 denote the same or similar components, having the same or similar function. Compared to the press apparatus 100 illustrated in FIG. 1 (and the press apparatus illustrated in FIG. 2), the press apparatus 100 illustrated in FIG. 3 has a different realization of the pressure medium guiding passage 21. The press apparatus 100 comprises a gasket 29, which is arranged intermediate a surface of the housing 2 and the bottom insulating portion 4. An outer gasket edge of the gasket 29 is connected to (possibly attached to) the surface of the housing 2, and an inner gasket edge of the gasket 29 is connected to (possibly attached to) the bottom insulating portion 4. The pressure medium guiding passage 21 is defined by a gap formed in the gasket 29.

Figure 4:
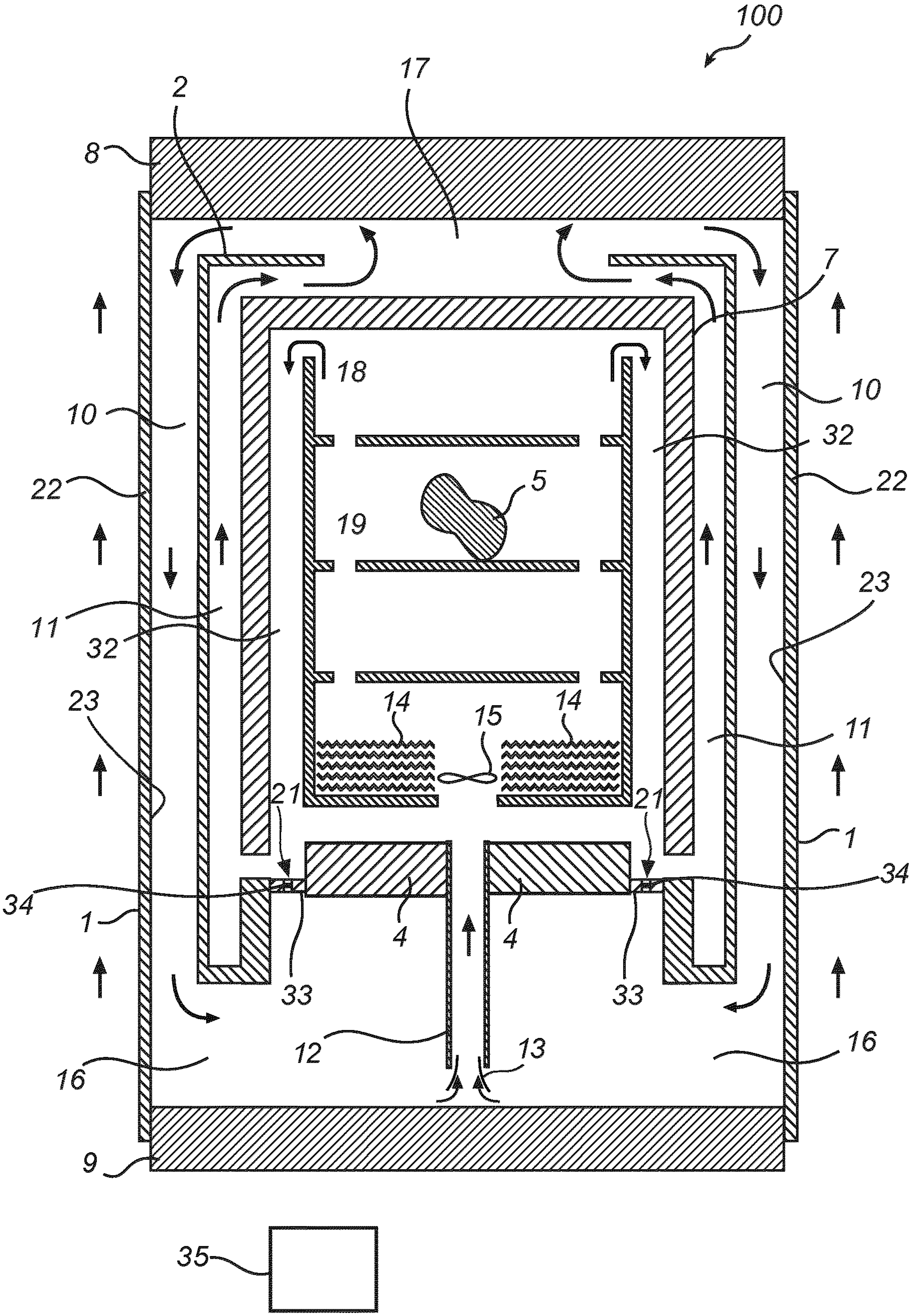

FIG. 4 is a schematic, in part sectional, side view of a press apparatus 100 according to an embodiment of the present invention. The press apparatus 100 illustrated in FIG. 4 is similar to the press apparatus 100 illustrated in FIG. 1, and the same reference numerals in FIGS. 1 and 4 denote the same or similar components, having the same or similar function.

The press apparatus 100 illustrated in FIG. 4 comprises a circular ring 33, which is arranged intermediate a surface of the housing 2 and the bottom insulating portion 4. The circular ring 33 is attached to the surface of the housing 2 and to the bottom insulating portion 4, respectively. The circular ring 33 may be attached to the surface of the housing 2 and to the bottom insulating portion 4 for example by means of screwing or welding. The pressure medium guiding passage 21 is arranged in the circular ring 33. It is to be understood that the pressure medium guiding passage 21 could be realized in other ways. For example, the circular ring 33 could be attached to only one of the surface of the housing 2 and to the bottom insulating portion 4, and be sealed against the other of the surface of the housing 2 and to the bottom insulating portion 4.

Compared to the press apparatus 100 illustrated in FIG. 1, the press apparatus 100 illustrated in FIG. 4 additionally comprises controllable pressure medium flow restrictions, schematically indicated at 34, which are arranged to selectively and controllably impede or obstruct a flow of pressure medium in the pressure medium guiding passage 21. The press apparatus 100 comprises a control unit 35, which is communicatively connected with the controllable pressure medium flow restrictions 34 for controlling operation thereof. The arrangement of the control unit 35 in relation to the pressure vessel 1, 8, 9 illustrated in FIG. 4 is exemplifying and for illustrating principles of embodiments of the present invention. The controllable pressure medium flow restriction 34 may for example comprise one or more adjustable valves, such as, for example, one or more solenoid valves, pneumatic valves, and/or motor operated valves.

Possibly, a plurality of pressure medium guiding passages may be provided, which pressure medium guiding passages for example may be arranged in the circular ring 33. The plurality of pressure medium guiding passages may be distributed radially, in a regular or irregular manner, in the circular ring 33. Each pressure medium guiding passage might be provided with one or more corresponding controllable pressure medium flow restrictions.

The control unit 35 is configured to control the controllable pressure medium flow restrictions 34 so as to impede or obstruct a flow of pressure medium in the pressure medium guiding passage 21 during a cooling phase of the treatment cycle (e.g., completely, or substantially completely, impede or obstruct flow of pressure medium in the pressure medium passage 21), and not impede or obstruct a flow of pressure medium in the pressure medium guiding passage 21 during another or other phases of the treatment cycle, including at least one of a heating phase and a vacuum phase.

In conclusion, a press apparatus is disclosed. The press apparatus comprises a pressure vessel, arranged to hold pressure medium therein during use of the press apparatus. The pressure vessel comprises a top end closure and a bottom end closure. A furnace chamber is arranged within the pressure vessel so that pressure medium can enter and exit the furnace chamber, the furnace chamber at least in part defining a treatment space arranged to accommodate an article. The press apparatus comprises at least one outer convection loop pressure medium guiding passage in fluid communication with the furnace chamber and arranged to form an outer convection loop within the pressure vessel. The outer convection loop is arranged to guide the pressure medium after having exited the furnace chamber in proximity to an inner surface of wall(s) of the pressure vessel to a space between the furnace chamber and the bottom end closure. At least one pressure medium guiding passage is arranged within the pressure vessel such that pressure medium may pass from the furnace chamber to the space between the furnace chamber and the bottom end closure, or vice versa, via only the at least one pressure medium guiding passage.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

What is claimed is:

1. A press apparatus comprising:

a pressure vessel, arranged to hold pressure medium therein during use of the press apparatus, the pressure vessel comprising a top end closure and a bottom end closure;

a furnace chamber arranged within the pressure vessel so that pressure medium can enter and exit the furnace chamber, the furnace chamber at least in part defining a treatment space arranged to accommodate at least one article, wherein the press apparatus is configured to subject the at least one article to a treatment cycle including a cooling phase;

at least one outer convection loop pressure medium guiding passage in fluid communication with the furnace chamber and arranged to form an outer convection loop within the pressure vessel, wherein the outer convection loop is arranged to guide the pressure medium after having exited the furnace chamber in proximity to an inner surface of wall(s) of the pressure vessel to a space between the furnace chamber and the bottom end closure;

a pressure medium flow generator arranged within the pressure vessel and in fluid communication with the furnace chamber, wherein at least during a cooling phase of the treatment cycle, the pressure medium flow generator is arranged to generate a transport of pressure medium from at least the space between the furnace chamber and the bottom end closure into the furnace chamber so as to cool the pressure medium in the treatment space; and at least one pressure medium guiding passage arranged within the pressure vessel such that pressure medium may pass from the furnace chamber to the space between the furnace chamber and the bottom end closure, or vice versa, via only the at least one pressure medium guiding passage, wherein each of the at least one pressure medium guiding passage is arranged such that a cross-section thereof in a plane perpendicular to a flow direction of the pressure medium through the pressure medium guiding passage is formed as a gap having a width wherein each of the at least one pressure medium guiding passage has a corresponding width, and wherein a sum of the width(s) is less than 4 mm.

2. A press apparatus according to claim 1, wherein each of the at least one pressure medium guiding passage is arranged such a sum of the corresponding cross-section width(s) is in a range 0.1 mm to 3.5 mm.

3. A press apparatus according to claim 1, wherein each of the at least one pressure medium guiding passage is arranged such that a sum of the corresponding cross-section width(s) is in a range 0.1 mm to 2.5 mm.

4. A press apparatus according to claim 1, wherein the pressure medium flow generator is controllable at least with respect to the flow rate of pressure medium transported from at least the space between the furnace chamber and the bottom end closure into the furnace chamber, wherein the rate of cooling of the pressure medium in the treatment space is governed at least in part by the flow rate of pressure medium transported from at least the space between the furnace chamber and the bottom end closure into the furnace chamber;

wherein each of the at least one pressure medium guiding passage is arranged such that a sum of the corresponding cross-section width(s) is based on estimated resistance to flow of pressure medium guided in the outer convection loop after having exited the furnace chamber at rates of cooling exceeding a selected rate of cooling threshold value, such that the corresponding cross-section width(s) causes a resistance to flow of pressure medium guided in the pressure medium guiding passage directly after having exited the furnace chamber to the space between the furnace chamber and the bottom end closure to become higher than the estimated resistance to flow of pressure medium guided in the outer convection loop after having exited the furnace chamber.

5. A press apparatus according to claim 1, wherein each of the at least one pressure medium guiding passage is arranged such that a cross-section thereof in a plane perpendicular to a flow direction of the pressure medium through the pressure medium guiding passage is formed as a gap having the shape of: at least part of a circular ring, at least part of an elliptical ring, or a rectangle.

6. A press apparatus according to claim 1, wherein the pressure medium flow generator is, at least during the cooling phase of the treatment cycle, arranged to generate a transport of pressure medium from another space in the press apparatus, wherein the temperature of the pressure medium in the other space is lower than the temperature of the pressure medium in the treatment space during at least part of the cooling phase, such that by transport of pressure medium during the cooling phase from the other space to the treatment space, the temperature of the pressure medium in the treatment space decreases.

7. A press apparatus according to claim 1, wherein the outer convection loop is arranged to guide the pressure medium after having exited the furnace chamber to a space between the top end closure and the furnace chamber, and further to guide the pressure medium from the space between the top end closure and the furnace chamber in proximity to the inner surface of walls of the pressure vessel to the space between the furnace chamber and the bottom end closure.

8. A press apparatus according to claim 1, comprising:

a plurality of outer convection loop pressure medium guiding passages in fluid communication with the furnace chamber and arranged to form the outer convection loop;

wherein the furnace chamber is at least partly enclosed by a heat insulated casing arranged so that pressure medium can enter and exit the furnace chamber, the heat insulated casing comprising a heat insulating portion, a housing at least partly enclosing the heat insulating portion, and a bottom insulating portion;

wherein a part of the outer convection loop comprises a first outer convection loop pressure medium guiding passage formed between at least portions of the housing and the heat insulating portion, respectively, and which is arranged to guide the pressure medium after having exited the furnace chamber to a space between the top end closure and the furnace chamber, and wherein another part of the outer convection loop comprises a second outer convection loop pressure medium guiding passage arranged to guide the pressure medium from the space between the top end closure and the furnace chamber in proximity to the inner surface of walls of the pressure vessel to a space between the bottom insulating portion and the bottom end closure, wherein said space between the bottom insulating portion and the bottom end closure is constituting or is included in said space between the furnace chamber and the bottom end closure;

wherein the at least one pressure medium guiding passage is arranged such that pressure medium may pass from the furnace chamber to the space between the bottom insulating portion and the bottom end closure, or vice versa, via only the at least one pressure medium guiding passage.

9. A press apparatus according to claim 8, wherein the at least one pressure medium guiding passage is at least in part defined by at least one gap formed between the bottom insulating portion and the housing.

10. A press apparatus according to claim 8, wherein the bottom insulating portion comprises a plate-shaped member, wherein the at least one pressure medium guiding passage is at least in part defined by at least one gap formed between an edge of the plate-shaped member and a surface of the housing.

11. A press apparatus according to claim 8, wherein the bottom insulating portion comprises a plate-shaped member, comprising a first outer surface, a second outer surface opposite to the first outer surface, an edge surface extending between the first outer surface and the second outer surface, and a disc or a circular ring attached to one of the first outer surface and the second outer surface, wherein the disc or circular ring is sized such that the disc or circular ring extends over at least a part of a boundary of the first outer surface or the second outer surface, and wherein the at least one pressure medium guiding passage is at least in part defined by a gap formed between an edge of the disc or circular ring and a surface of the housing.

12. A press apparatus according to claim 8, further comprising a circular ring attached to a surface of the housing, the circular ring being attached to the surface of the housing and sized such that the at least one pressure medium guiding passage is at least in part defined by a gap formed between the circular ring and the bottom insulating portion.

13. A press apparatus according to claim 8, further comprising a gasket arranged intermediate a surface of the housing and the bottom insulating portion, an outer gasket edge being connected to the surface of the housing and an inner gasket edge being connected to the bottom insulating portion, wherein the at least one pressure medium guiding passage is at least in part defined by a gap formed in the gasket.

14. A press apparatus according to claim 1, wherein the at least one pressure medium guiding passage is curved.

15. A press apparatus comprising:

a pressure vessel, arranged to hold pressure medium therein during use of the press apparatus, the pressure vessel comprising a top end closure and a bottom end closure;

a furnace chamber arranged within the pressure vessel so that pressure medium can enter and exit the furnace chamber, the furnace chamber at least in part defining a treatment space arranged to accommodate at least one article, wherein the press apparatus is configured to subject the at least one article to a treatment cycle including a cooling phase;

at least one outer convection loop pressure medium guiding passage in fluid communication with the furnace chamber and arranged to form an outer convection loop within the pressure vessel, wherein the outer convection loop is arranged to guide the pressure medium after having exited the furnace chamber in proximity to an inner surface of wall(s) of the pressure vessel to a space between the furnace chamber and the bottom end closure;

a pressure medium flow generator arranged within the pressure vessel and in fluid communication with the furnace chamber, wherein at least during a cooling phase of the treatment cycle, the pressure medium flow generator is arranged to generate a transport of pressure medium from at least the space between the furnace chamber and the bottom end closure into the furnace chamber so as to cool the pressure medium in the treatment space;

at least one pressure medium guiding passage arranged within the pressure vessel such that pressure medium may pass from the furnace chamber to the space between the furnace chamber and the bottom end closure, or vice versa, via only the at least one pressure medium guiding passage;

one or more controllable pressure medium flow restrictions arranged to selectively and controllably impede or obstruct a flow of pressure medium in the at least one pressure medium passage; and a control unit communicatively connected with the one or more controllable pressure medium flow restrictions for controlling operation thereof, wherein the control unit is configured to control the one or more controllable pressure medium flow restrictions so as to impede or obstruct a flow of pressure medium in the at least one pressure medium guiding passage during a cooling phase of the treatment cycle and not impede or obstruct a flow of pressure medium in the at least one pressure medium guiding passage during another or other phases of the treatment cycle including at least one of a heating phase, a hold phase, a pumping phase and a vacuum phase, or any combination thereof;

wherein the press apparatus is arranged such that:

the furnace chamber is at least partly enclosed by a heat insulated casing arranged so that pressure medium can enter and exit the furnace chamber, the heat insulated casing comprising a heat insulating portion, a housing at least partly enclosing the heat insulating portion, and a bottom insulating portion, wherein a heat absorbing element is arranged between an upper part of the heat insulating portion and an opening in the housing; and/or such that:

a heat exchanging element is arranged in the top end closure.

16. A press apparatus according to claim 15, wherein the furnace chamber is at least partly enclosed by a heat insulated casing arranged so that pressure medium can enter and exit the furnace chamber, the heat insulated casing comprising a heat insulating portion, a housing at least partly enclosing the heat insulating portion, and a bottom insulating portion, the press apparatus further comprising:

a circular ring arranged intermediate a surface of the housing and the bottom insulating portion;

wherein the press apparatus comprises a plurality of pressure medium guiding passages arranged within the pressure vessel such that pressure medium may pass from the furnace chamber to the space between the furnace chamber and the bottom end closure, or vice versa, via only the plurality of pressure medium guiding passages, wherein the plurality of pressure medium guiding passages are arranged and distributed radially in the circular ring;

wherein the press apparatus comprises a plurality of controllable pressure medium flow restrictions arranged to selectively and controllably impede or obstruct a flow of pressure medium in the plurality of pressure medium passages, wherein each of the plurality of pressure medium passages is provided with one or more corresponding pressure medium flow restrictions of the plurality of controllable pressure medium flow restrictions;

wherein the control unit is configured to control the plurality of controllable pressure medium flow restrictions so as to impede or obstruct a flow of pressure medium in the plurality of pressure medium guiding passages during the cooling phase of the treatment cycle and not impede or obstruct a flow of pressure medium in the plurality of pressure medium guiding passages during another or other phases of the treatment cycle including at least one of the heating phase, the hold phase, the pumping phase and the vacuum phase, or any combination thereof.

17. A method in a press apparatus, the press apparatus comprising a pressure vessel, arranged to hold pressure medium therein during use of the press apparatus, the pressure vessel comprising a top end closure and a bottom end closure, a furnace chamber arranged within the pressure vessel so that pressure medium can enter and exit the furnace chamber, the furnace chamber at least in part defining a treatment space arranged to accommodate at least one article, wherein the press apparatus is configured to subject the at least one article to a treatment cycle including a cooling phase, the press apparatus further comprising at least one outer convection loop pressure medium guiding passage in fluid communication with the furnace chamber and arranged to form an outer convection loop within the pressure vessel, wherein the outer convection loop is arranged to guide the pressure medium after having exited the furnace chamber in proximity to an inner surface of wall(s) of the pressure vessel to a space between the furnace chamber and the bottom end closure, the press apparatus further comprising a pressure medium flow generator arranged within the pressure vessel and in fluid communication with the furnace chamber, wherein at least during a cooling phase of the treatment cycle, the pressure medium flow generator is arranged to generate a transport of pressure medium from at least the space between the furnace chamber and the bottom end closure into the furnace chamber so as to cool the pressure medium in the treatment space, the press apparatus further comprising at least one pressure medium guiding passage arranged within the pressure vessel such that pressure medium may pass from the furnace chamber to the space between the furnace chamber and the bottom end closure, or vice versa, via only the at least one pressure medium guiding passage, the press apparatus further comprising one or more controllable pressure medium flow restrictions arranged to selectively and controllably impede or obstruct a flow of pressure medium in the at least one pressure medium passage, the method comprising:

controlling the one or more controllable pressure medium flow restrictions so as to impede or obstruct a flow of pressure medium in the at least one pressure medium guiding passage during a cooling phase of the treatment cycle and not impede or obstruct a flow of pressure medium in the at least one pressure medium guiding passage during another or other phases of the treatment cycle including at least one of a heating phase, a hold phase, a pumping phase and a vacuum phase, or any combination thereof;

wherein the press apparatus is arranged such that:

the furnace chamber is at least partly enclosed by a heat insulated casing arranged so that pressure medium can enter and exit the furnace chamber, the heat insulated casing comprising a heat insulating portion, a housing at least partly enclosing the heat insulating portion, and a bottom insulating portion, wherein a heat absorbing element is arranged between an upper part of the heat insulating portion and an opening in the housing; and/or such that:

a heat exchanging element is arranged in the top end closure.

18. A method according to claim 17, wherein the furnace chamber is at least partly enclosed by a heat insulated casing arranged so that pressure medium can enter and exit the furnace chamber, the heat insulated casing comprising a heat insulating portion, a housing at least partly enclosing the heat insulating portion, and a bottom insulating portion, wherein the press apparatus further comprises a circular ring arranged intermediate a surface of the housing and the bottom insulating portion, wherein the press apparatus comprises a plurality of pressure medium guiding passages arranged within the pressure vessel such that pressure medium may pass from the furnace chamber to the space between the furnace chamber and the bottom end closure, or vice versa, via only the plurality of pressure medium guiding passages, wherein the plurality of pressure medium guiding passages are arranged and distributed radially in the circular ring, and wherein the press apparatus comprises a plurality of controllable pressure medium flow restrictions arranged to selectively and controllably impede or obstruct a flow of pressure medium in the plurality of pressure medium passages, wherein each of the plurality of pressure medium passages is provided with one or more corresponding pressure medium flow restrictions of the plurality of controllable pressure medium flow restrictions, the method comprising:

controlling the plurality of controllable pressure medium flow restrictions so as to impede or obstruct a flow of pressure medium in the plurality of pressure medium guiding passages during the cooling phase of the treatment cycle and not impede or obstruct a flow of pressure medium in the plurality of pressure medium guiding passages during another or other phases of the treatment cycle including at least one of the heating phase, the hold phase, the pumping phase and the vacuum phase, or any combination thereof.

19. A computer program comprising instructions, which when executed by one or more processors comprised in a control unit, cause the control unit to perform a method according to claim 17.

20. A processor-readable medium is provided having a computer program loaded thereon, wherein the computer program comprises instructions, which, when executed by one or more processors comprised in a control unit, cause the control unit to perform a method according to claim 17.

* * * * *